United States Patent
Takizawa

(10) Patent No.: US 8,736,702 B2
(45) Date of Patent: May 27, 2014

(54) APPARATUS AND METHOD OF CALCULATING A SHOOTING FREQUENCY BASED ON THE OBTAINED SOUND INFORMATION

(75) Inventor: Junichi Takizawa, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 742 days.

(21) Appl. No.: 12/976,156

(22) Filed: Dec. 22, 2010

(65) Prior Publication Data
US 2011/0149108 A1 Jun. 23, 2011

(30) Foreign Application Priority Data

Dec. 22, 2009 (JP) .................................. 2009-290775
Dec. 10, 2010 (KR) .......................... 10-2010-0126353

(51) Int. Cl.
*H04N 5/228* (2006.01)
*H04N 5/225* (2006.01)
*H04N 5/235* (2006.01)

(52) U.S. Cl.
USPC ..................... 348/222.1; 348/207.99; 348/362

(58) Field of Classification Search
USPC ................. 348/239, 222.1, 363, 362, 207.99, 348/231.4
See application file for complete search history.

(56) References Cited

U.S. PATENT DOCUMENTS

| 8,502,870 B2 * | 8/2013 | Bentkovski | 348/155 |
| 2005/0177359 A1 * | 8/2005 | Lu et al. | 704/200 |
| 2006/0170787 A1 * | 8/2006 | Bentkovski | 348/222.1 |
| 2006/0193624 A1 * | 8/2006 | Mino et al. | 396/312 |
| 2007/0013808 A1 * | 1/2007 | Tagawa | 348/362 |
| 2009/0237527 A1 * | 9/2009 | Mizuno et al. | 348/231.2 |
| 2009/0295948 A1 * | 12/2009 | Oishi | 348/239 |
| 2011/0096168 A1 * | 4/2011 | Siann et al. | 348/158 |
| 2011/0254979 A1 * | 10/2011 | Okazaki | 348/231.4 |

FOREIGN PATENT DOCUMENTS

| JP | 06-175205 A | 6/1994 |
| JP | 2002-330327 A | 11/2002 |
| JP | 2004-120575 A | 4/2004 |
| JP | 2009-077325 A | 4/2009 |

* cited by examiner

*Primary Examiner* — Tuan Ho
*Assistant Examiner* — Selam Gebriel
(74) *Attorney, Agent, or Firm* — Drinker Biddle & Reath LLP

(57) ABSTRACT

A non-transitory computer program product, photographing apparatus and a method of controlling the photographing apparatus, the method including obtaining sound information; calculating a shooting frequency based on the obtained sound information; and controlling a shutter of an imaging device to obtain image data according to the calculated shooting frequency.

12 Claims, 3 Drawing Sheets

APPARATUS AND METHOD OF CALCULATING A SHOOTING FREQUENCY BASED ON THE OBTAINED SOUND INFORMATION

CROSS-REFERENCE TO RELATED PATENT APPLICATION

This application claims the benefit of Japanese Patent Application No. 2009-290775, filed on Dec. 22, 2009, in the Japanese Patent Office, the entire disclosure of which is incorporated herein by reference, and claims the benefit of Korean Patent Application No. 10-2010-0126353, filed on Dec. 10, 2010, in the Korean Intellectual Property Office, the entire disclosure of which is incorporated herein by reference.

BACKGROUND

1. Field of the Invention

The present invention relates to a photographing apparatus and a method of controlling the photographing apparatus during continuous shooting.

2. Description of the Related Art

Some photographing apparatuses have a high speed continuous shooting function. The high speed continuous shooting function makes it possible for a photographer to increase the probability of obtaining a better photograph particularly when the subject is moving.

However, the high speed continuous shooting function, may consume a lot of memory to store all the captured images, and may rapidly consume the battery power of the photographing apparatus. Furthermore, it may be inconvenient for the photographer to examine all the images captured during the high speed continuous shooting to find a good photograph.

Thus, the photographer may become frustrated with the current high speed continuous shooting function provided by photographing apparatuses.

SUMMARY

Therefore, there is a need in the art for a method, non-transitory computer readable medium, and photographing apparatus, the photographing apparatus including: an imaging device configured to obtain image data; a sound information obtaining unit configured to obtain sound information; a sound information analyzing unit configured to analyze the sound information obtained by the sound information obtaining unit; a timing calculating unit configured to calculate a timing when a continuous shooting density is adjusted based on the analyzing of the sound information; and a shutter control unit configured to control a shutter of the imaging device to adjust the continuous shooting density at the calculated timing.

The shutter control unit may further be configured to control the shutter of the imaging device to increase the continuous shooting density at the calculated timing.

The shutter control unit may further be configured to control the shutter of the imaging device to increase the continuous shooting density at the calculated timing and to reduce the continuous shooting density between the calculated timing.

The timing calculating unit may be configured to calculate a timing to increase the continuous shooting density.

The shutter control unit may be configured to control the shutter of the imaging device to periodically increase the continuous shooting density at the calculated timing.

The sound information analyzing unit may be configured to analyze a rhythm or tempo when the sound information obtained by the sound information obtaining unit is music.

The timing calculating unit may be configured to increase the continuous shooting density at a timing sequence of a beat of the music.

The sound information analyzing unit may be configured to analyze a pronunciation timing of a vowel formant when the sound information obtained by the sound information obtaining unit is a human voice.

The timing calculating unit may be configured to increase the continuous shooting density at the pronunciation timing of the vowel.

The photographing apparatus may include a sound database in which the sound information is stored; and a speaker configured to generate sound based on the sound information stored in the sound database.

The sound information obtaining unit may be configured to analyze the sound information stored in the sound database.

A method of controlling a photographing apparatus is disclosed. The method may include obtaining sound information; calculating a shooting frequency based on the obtained sound information; and controlling a shutter of an imaging device to obtain image data according to the calculated shooting frequency.

The method may include retrieving sound information that is music from a database; and playing the sound information on a speaker.

The method may include if there is analyzed obtained sound information in the database, retrieving the analyzed obtained sound information including a beat from the database, otherwise: analyzing the obtained sound information to determine a beat of the sound.

Calculating a shooting frequency may be based on the analyzed obtained sound information so that the shooting frequency is increased at the beat of the sound and decreased between beats of the sound.

Sound may be obtain from a microphone.

The method may include analyzing the obtained sound information to determine a beat of the sound; and wherein calculating a shooting frequency.

Calculating a shooting frequency may be based on the analyzed obtained sound information so that the shooting frequency is increased at the beat of the sound and decreased between beats of the sound.

Sound information may be obtained from a microphone.

The method may include analyzing of the obtained sound information to determine a pronunciation timing of a vowel formant, if the obtained sound information is a human voice.

Calculating a shooting frequency may be based on the analyzed obtained sound information so that the shooting frequency is increased at the pronunciation timing of the vowel formant and decreased between the pronunciation of the vowel formant.

Sound information may be obtained from a microphone.

Analyzing of the obtained sound information may determine a rate of a speech of a person from the sound information.

Calculating a shooting frequency may be based on the analyzed obtained sound information so that the shooting frequency is increased the faster the rate of the speech of the person and decreased the slower the rate of the speech of the person.

A non-transitory computer program product is disclosed. The non-transitory computer program product may be a computer usable medium having a computer readable program code embodied therein, said computer readable program code adapted to be executed to implement a method of controlling a photographing apparatus according to the method disclosed above.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION OF THE INVENTION

Figure 1:
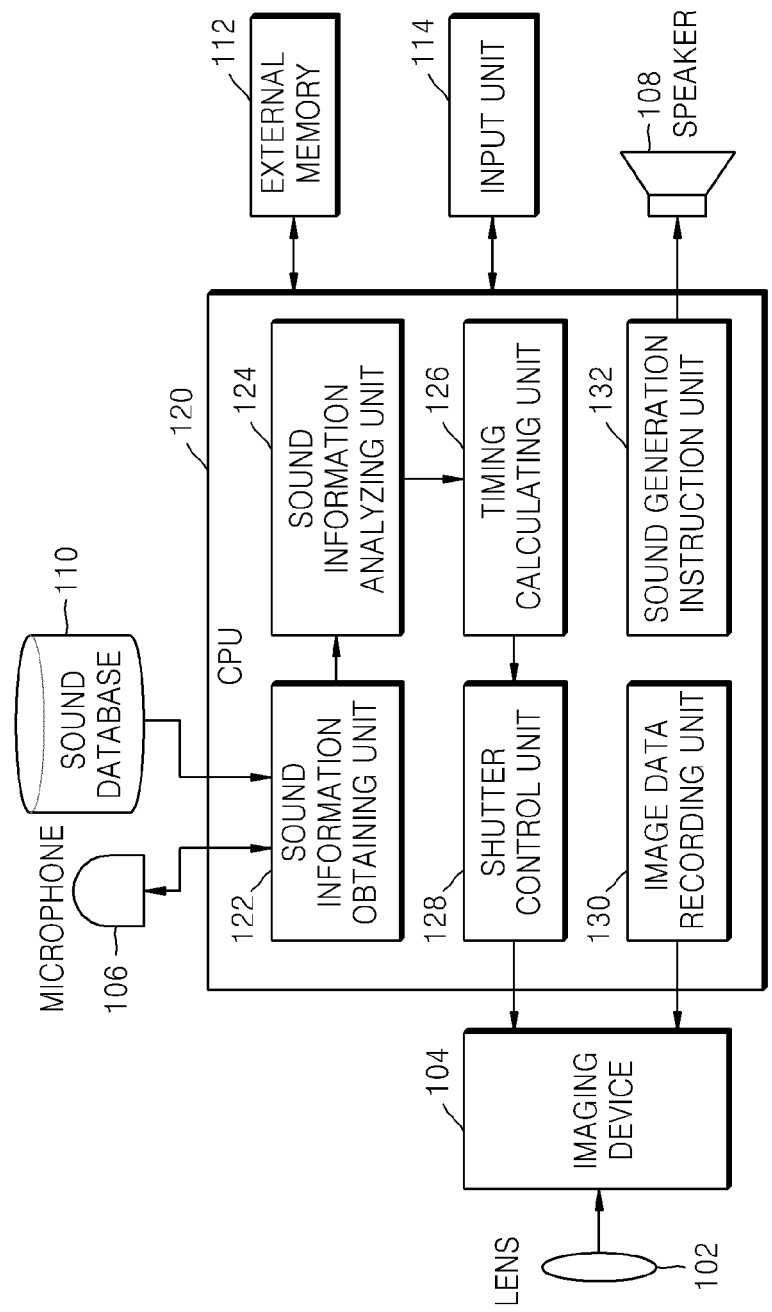
FIG. 1 is a block diagram of a photographing apparatus according to an embodiment of the invention.

FIG. 1 is a block diagram of a photographing apparatus 100 according to an embodiment of the invention. Referring to FIG. 1, the photographing apparatus 100 is, for example, a digital still camera (DSC), and has a high speed continuous shooting function. The photographing apparatus 100 includes a photographing lens optical system 102, an imaging device 104, a microphone 106, a speaker 108, a sound database 110, an external memory 112, an input unit 114, and a central processing unit (CPU) 120.

The photographing lens optical system 102 forms a subject image on an imaging surface of the imaging device 104. The photographing device 104 includes a sensor, such as a charge-coupled device (CCD) or a complementary metal oxide semiconductor (CMOS) image sensor, which optically converts the subject image formed on the imaging surface, and inputs the optically converted subject image as the image data in the CPU 120. The microphone 106 obtains sound from around the photographing apparatus 100 and inputs the obtained sound as sound data. The sound database 110 stores sound data, such as music or a predetermined rhythm. The external memory 112 is, for example, an external recording medium detachable from the photographing apparatus 100, and may record the image data obtained from the imaging device 104.

The CPU 120 includes an image data recording unit 130 that performs predetermined processing on the image data received from the imaging device 104 and stores the processed image data in the external memory 112. The CPU 120 further includes a sound generation instruction unit 132 that sends the sound data stored in the sound database 110 to the speaker 108 and generates sound from the speaker 108. The CPU 120 also analyzes external or internal sound, and controls a continuous shooting density of a shutter to periodically increase and decrease the shooting density, based on the analysis. To this end, the CPU 120 includes a sound information obtaining unit 122, a sound information analyzing unit 124, a timing calculating unit 126, a shutter control unit 128, etc. Each block of the CPU 120 of FIG. 1 may be realized by the CPU 120 and a program or software for operating the CPU 120.

As described above, the photographing apparatus 100 includes a high speed continuous shooting function. The high speed continuous shooting function of the photographing apparatus 100 automatically obtains images of a subject multiple times, and by so doing increases a probability of obtaining an image of the subject in a pose that the photographer wants to capture. The photographing apparatus 100 may store the images in an order with the images most likely to satisfy the photographer first.

Meanwhile, when the photographing apparatus 100 photographs a subject by using the high speed continuous shooting function, the amount of image data to be stored increases, and thus a capacity of the external memory 112 or power of a battery for driving the photographing apparatus 100 is greatly consumed. Furthermore, a user of the photographing apparatus 100 needs to extract a good image from a series of continuously captured images after photographing is performed, which may be complicated and time consuming due to the large number of images that may be captured when high speed photographing is performed. For example, if one hundred images are continuously captured, the capacity of the external memory 112 and/or power of the battery of the photographing apparatus 100 is greatly consumed, and it is difficult to select a desired image from the one hundred continuously captured images.

As described above, often a photographing opportunity is not missed owing to the high speed continuous shooting; however, the above-described problems occur. In the current embodiment, sound and music stored in the sound database 110 of the photographing apparatus 100 or sound and music from around the photographing apparatus 100 are analyzed, and a continuous shooting density (or frequency) is intelligently controlled. For example, the frequency of taking images may be in accordance with a tempo of the music. In this regard, when a shutter undergoes a short time interval of continuous shooting (that is the frequency of taking images is increased), the continuous shooting is said to be of a high density, and when the shutter undergoes a long time interval of continuous shooting (that is the frequency of taking images is decreased), the continuous shooting is said to be of a low density. The continuous shooting density may also be referred to as a shooting frequency indicating how often images are obtained over a period of time. The frequency may change with time. A change in the continuous shooting density according to sound makes it possible for a person being photographed to be informed of a photographing timing and recognize the high density continuous shooting in accordance with sound, so that the person being photographed can show an expression or strike a pose desired by a photographer at a time of the high density continuous shooting. Further, the continuous shooting density may be controlled to be low. Thus, the total number of captured images is reduced, and a probability of obtaining a good photograph is increased, by controlling the continuous shooting density. Therefore, while the total number of captured images is reduced, the probability of getting a good photograph is still good compared with the conventional continuous shot function.

More specifically, the CPU 120 analyzes sound data obtained by the sound information obtaining unit 122 or the sound data stored in the sound database 110, and detects a timing sequence of a beat from a rhythm and tempo thereof. The CPU 120 analyzes the sound data obtained by the sound information obtaining unit 122 or the sound data stored in the sound database 110 by using the sound information analyzing unit 124, and, if the sound data is a human voice, detects a time when a vowel is pronounced. The timing calculating unit 126 of the CPU 120 sets a time to increase the continuous shooting density at the timing sequence of a beat or at the time when the vowel is pronounced, or based on the rhythm of music, or the speed in which a person is speaking. The shutter controller unit 128 of the CPU 120 instructs the imaging device 104. The imaging device 104 increases the continuous shooting density at a time instructed by the CPU 120. Thus, a shutter pressing interval, i.e. a shutter release interval, becomes shorter at timing sequence of a beat or at the time when the vowel is pronounced. In the current embodiment, continuous shooting having a density that changes according to sound is defined as intelligent continuous shooting. A user may use the input unit 114 to select one of general continuous shooting having a constant continuous shooting density and the intelligent continuous shooting and perform photographing. The input unit 114 receives manipulation information from the user through an input interface such as a manipulation button, a pointing device, a touch panel, etc.

Figure 2:
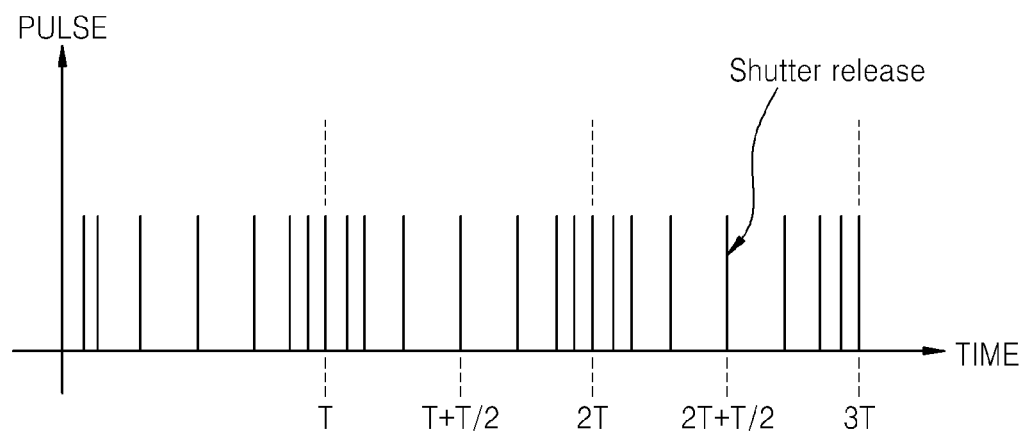
FIG. 2 is a graph showing a continuous shooting density that periodically increases when music having a specific rhythm and tempo is played, according to an embodiment of the invention.

FIG. 2 is a graph showing a continuous shooting density that periodically increases when music having a specific rhythm and tempo is played, according to an embodiment of the invention. Referring to FIG. 2, times T, 2T, 3T, . . . indicate a timing sequence of a beat of music. A shutter release interval becomes short and a continuous shooting density increases at the timing sequence of a beat. If sound obtained by the microphone 106 has a constant rhythm and tempo, since the timing sequence of a beat has a constant cycle, the continuous shooting density increases at the timing sequence of a beat T, and decreases at a time between the beats.

Figure 3:
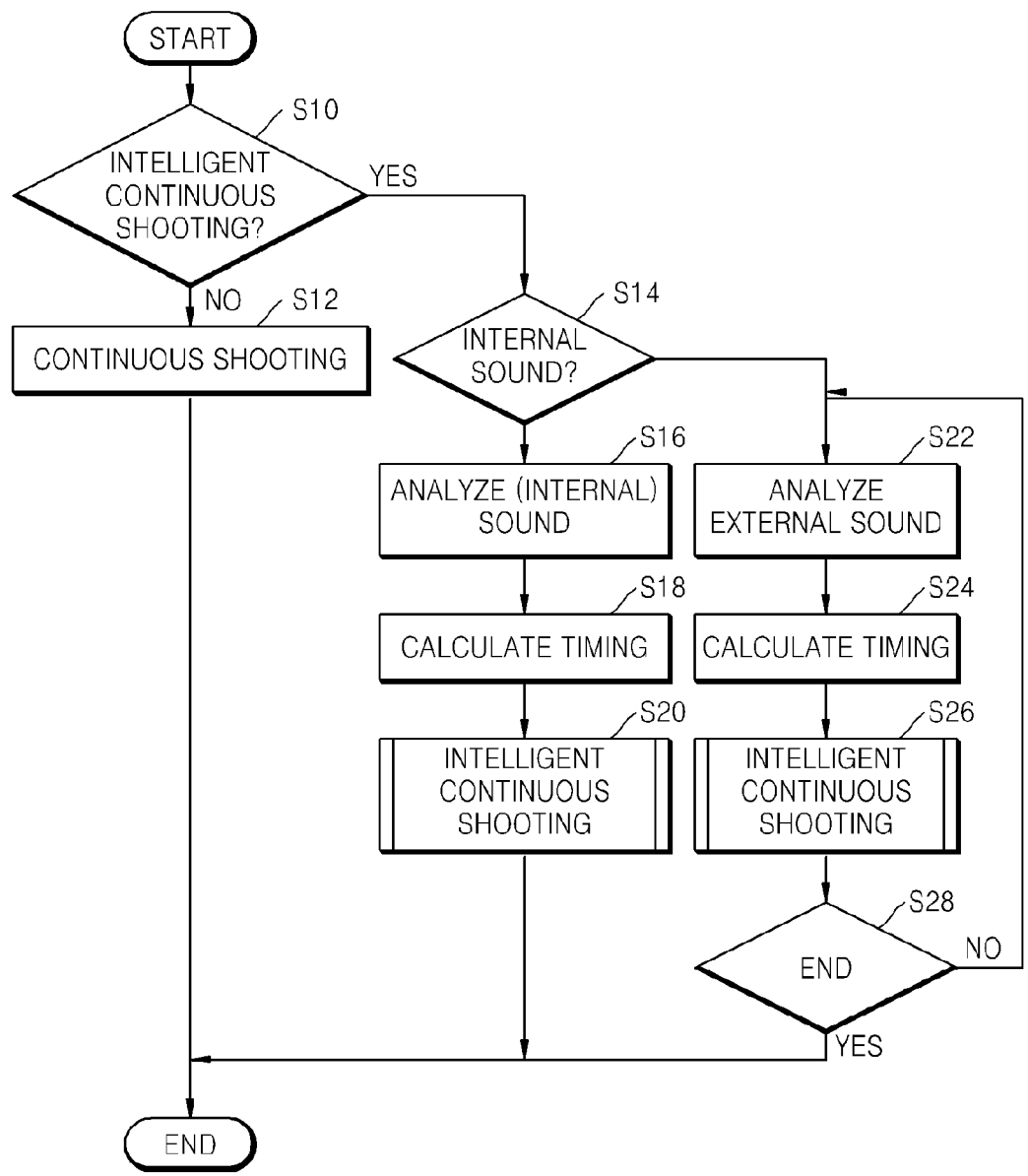
FIG. 3 is a flowchart of a method of controlling a photographing apparatus according to an embodiment of the invention.

FIG. 3 is a flowchart of a method of controlling a photographing apparatus according to an embodiment of the invention. Referring to FIG. 3, in operation S10, it is determined whether a user selects intelligent continuous shooting. If it is determined that the user does not select the intelligent continuous shooting, general continuous shooting is carried out in operation S12. The general continuous shooting is continuously performed and limited by a factor that most impedes photographing among a shutter speed that is determined according to a brightness of a subject, a processing speed of the CPU 120, and a transmission speed to the external memory 112. The shortest time for obtaining an image may be represented by a time, TMIN, which then determines the maximum frequency or density that images may be obtained in continuous shooting. TMIN may be, for example, the shutter speed.

Meanwhile, if it is determined that the user selects the intelligent continuous shooting, it is determined whether the user selects an internal sound in operation S14. If it is determined that the user selects the internal sound, the CPU 120 allows the speaker 108 to output a sound stored in the sound database 110 in operation S16. In operation S16, the CPU 120 analyzes data of music or the sound output by the speaker 108 or else, previously analyzed data may be stored in the sound database 110 may be accessed. During the analysis of the sound, if the sound output by the speaker 108 is a human voice, vowel generating timing is estimated. If the sound output by the speaker 108 is music, timing corresponding to a rhythm or tempo is extracted. In operation S18, timing for changing shutter timing is calculated based on the analyzed data and based on the time interval TMIN during general photographing. In operation S20, the continuous shooting is carried out by changing the shutter timing based on the calculated timing.

Meanwhile, if it is determined that the user selects an external sound in operation S14, a sound is input to the microphone 106, which is included in the photographing apparatus 100 to the CPU 120. Although the external sound is processed in the same manner as the internal sound, since the sound is not previously analyzed, the continuous shooting density is set by feeding back the analysis. The CPU 120 analyzes the external sound in the same manner as the internal sound in operation S22, calculates a time that the continuous shooting density increases in operation S24, and carries out the continuous shooting by changing the shutter timing based on the calculated time in operation S26.

During the analysis of the sound in operations S16 and S22, if a human voice is analyzed, a time that a vowel is pronounced is detected. To this end, the sound undergoes Fourier transformation, and a power spectrum is calculated. Then, a formant is extracted from power characteristics for each frequency. In this regard, the formant means a distribution of frequency intensities such as a tune of a vowel in a mouth, and causes a personal unique tone due to a personal difference according to a size of the mouth. In general, a sound wave of a vocal sound produces a unique frequency distribution form for each sound, which is determined by using a frequency measurement analyzer. In a vowel, the frequency distribution form is comprised of a basic frequency (mostly 75~300 Hz) indicating a vibration number per second of vocal cords and high frequencies by integer multiples of the basic frequency. The number of the high frequencies is emphasized (generally three), and the high frequencies are referred to as first, second, and third formants, sequentially going from low frequencies. In this regard, since formant characteristics are determined for each vowel, an interval from a vowel formant to a next vowel formant may be called Ti, and the continuous shooting is carried out at a time interval T obtained according to equation 1 below. Thus, the continuous shooting density can increase at the time that the vowel is pronounced.

$$\sum_{k=i-n}^{k=i} Tk/n \qquad \text{[Equation 1]}$$

In this regard, the interval from a vowel formant to a next vowel formant generally changes according to a speed of a person's speaking. Thus, when a photographer photographs a person while speaking to the person being photographed, the photographer can tell the person being photographed that a shutter timing interval is controlled according to a speed of a photographer's speaking, so that the photographed person changes an expression according to the speed of the photographer's speaking, thereby increasing a probability of obtaining an optimum shot. Alternatively, the photographer can photograph the person while the person being photographed speaks to the photographer. In this case, since the continuous shooting density can change according to a speed of the person's speaking, the probability of obtaining a good photograph is increased.

Furthermore, if photographing is synchronized with a rhythm and tempo of music, the CPU 120 analyzes the rhythm and tempo of the external or internal sound. In this case, the CPU 120 detects a basic frequency of the external or internal sound, and detects a timing sequence of a beat by obtaining a peak of times of the basic frequency. In this regard, the timing sequence of a beat may be detected by using a conventional technology. The continuous shooting density is controlled in synchronization with a time of an extracted rhythm or the timing sequence of a beat. When a rhythm interval is shorter than the interval TMIN, the interval TMIN may be used. A shorter interval may be below the limit of perceptibility of human hearing. As shown in FIG. 2, the continuous shooting density is controlled to be high at nT and low at nT+T/2 (where n is a natural number).

As described above, the person being photographed can be told that the photographer is photographing the person being photographed in accordance with the rhythm of the music, and thus the person being photographed can show an good expression or strike a good pose at the timing sequence of a beat when the continuous shooting density increases.

Therefore, since a photographing timing is given to the person being photographed via sound in cases of a human sound and music, the person being photographed can be informed of a time when the continuous shooting density increases, and can show an good expression or take a good pose at the informed time, thereby greatly increasing a probability of obtaining an optimum shot. As described above, in the embodiments of the invention, a shutter time is informed via sound or music by using an intelligent continuous shooting function of the photographing apparatus 100. Sound or music has characteristics that are easily synchronized with a human, such as a rhythm or tempo and are used to control a continuous shooting interval. Sound is used to obtain a common or implied agreement between a subject and a photographer, and photographing is performed based on the common or implied agreement, thereby directing many good photographs.

Thus, the number of photographing images or a photographing time is reduced, and an optimum shot is easily extracted. Furthermore, since the photographed person may be nervous at an instant of time that a shutter is pressed, several shutter changes can be given to the photographed person. Since photographing is performed at a time when the rhythm of the music relaxes the person being photographed, the probability of obtaining the best shot can be further increased.

The functionality associated with describing embodiments of the invention is described with a number of illustrative units. However, the units may be differently arranged so that the functionality of a single unit may be implemented with two or more units and the functionality of two or more units may be combined into a single unit. Moreover, the functionality may be differently arranged between illustrative units.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A photographing apparatus comprising:
    an imaging device configured to obtain image data;
    a sound information obtaining unit configured to obtain sound information;
    a sound information analyzing unit configured to
        analyze the sound information obtained by the sound information obtaining unit; and
        analyze a rhythm or tempo when the sound information obtained by the sound information obtaining unit is music;
    a timing calculating unit configured to
        calculate a timing when a continuous shooting density is adjusted based on the analyzing of the sound information; and
        increase the continuous shooting density at a timing sequence of a beat of the music; and
    a shutter control unit configured to control a shutter of the imaging device to adjust the continuous shooting density at the calculated timing.

2. The photographing apparatus of claim 1, wherein the shutter control unit is further configured to control the shutter of the imaging device to increase the continuous shooting density at the calculated timing.

3. The photographing apparatus of claim 1, wherein the shutter control unit is further configured to control the shutter of the imaging device to increase the continuous shooting density at the calculated timing and to reduce the continuous shooting density between the calculated timing.

4. The photographing apparatus of claim 1, wherein the timing calculating unit is configured to calculate a timing to increase the continuous shooting density, and
    wherein the shutter control unit is configured to control the shutter of the imaging device to periodically increase the continuous shooting density at the calculated timing.

5. The photographing apparatus of claim 1, further comprising:
    a sound database in which the sound information is stored; and
    a speaker configured to generate sound based on the sound information stored in the sound database, and wherein the sound information obtaining unit is configured to analyze the sound information stored in the sound database.

6. A photographing apparatus comprising:
    an imaging device configured to obtain image data;
    a sound information obtaining unit configured to obtain sound information;
    a sound information analyzing unit configured to analyze a pronunciation timing of a vowel formant when the sound information obtained by the sound information obtaining unit is a human voice;

a timing calculating unit configured to increase the continuous shooting density at the pronunciation timing of the vowel; and a shutter control unit configured to control a shutter of the imaging device to adjust the continuous shooting density at the calculated timing.

7. A method of controlling a photographing apparatus, the method comprising:

obtaining sound information from a microphone;

analyzing the obtained sound information to determine a beat of the sound;

calculating a shooting frequency based on the obtained sound information so that the shooting frequency is increased at the beat of the sound and decreased between beats of the sound; and controlling a shutter of an imaging device to obtain image data according to the calculated shooting frequency.

8. A method of controlling a photographing apparatus, the method comprising:

obtaining sound information;

retrieving sound information which is music from a database;

playing the sound information on a speaker;

if there is analyzed obtained sound information in the database corresponding to the retrieved sound information, retrieving the analyzed obtained sound information including a beat from the database, otherwise analyzing the obtained sound information to determine a beat of the sound;

calculating a shooting frequency based on the analyzed obtained sound information so that the shooting frequency is increased at the beat of the sound and decreased between beats of the sound; and controlling a shutter of an imaging device to obtain image data according to the calculated shooting frequency.

9. A method of controlling a photographing apparatus, the method comprising:

obtaining sound information;

retrieving sound information which is music from a database;

playing the sound information on a speaker;

if there is analyzed obtained sound information in the database corresponding to the retrieved sound information, retrieving the analyzed obtained sound information including a rhythm from the database, otherwise analyzing the obtained sound information to determine a rhythm of the sound;

calculating a shooting frequency based on the analyzed obtained sound information so that the shooting frequency is increased the faster the rhythm and decreased the slower the rhythm; and controlling a shutter of an imaging device to obtain image data according to the calculated shooting frequency.

10. A method of controlling a photographing apparatus, the method comprising:

obtaining sound information from a microphone; further comprises:

analyzing of the obtained sound information to determine a pronunciation timing of a vowel formant, if the obtained sound information is a human voice;

calculating a shooting frequency based on the analyzed obtained sound information so that the shooting frequency is increased at the pronunciation timing of the vowel formant and decreased between the pronunciation of the vowel formant; and controlling a shutter of an imaging device to obtain image data according to the calculated shooting frequency.

11. A method of controlling a photographing apparatus, the method comprising:

obtaining sound information from a microphone;

analyzing of the obtained sound information to determine a rhythm of speech of a person from the sound information;

calculating a shooting frequency based on the analyzed obtained sound information so that the shooting frequency is increased the faster the rhythm and decreased the slower the rhythm; and controlling a shutter of an imaging device to obtain image data according to the calculated shooting frequency.

12. A non-transitory computer program product, comprising a computer usable medium having a computer readable program code embodied therein, said computer readable program code adapted to be executed to implement a method of controlling a photographing apparatus according to claim 7.

* * * * *